United States Patent
Uttaro et al.

(10) Patent No.: US 8,934,485 B2
(45) Date of Patent: *Jan. 13, 2015

(54) METHODS AND APPARATUS TO DETERMINE AN ALTERNATE ROUTE IN A NETWORK

(71) Applicant: AT&T Intellectual Property I, L.P., Atlanta, GA (US)

(72) Inventors: James Uttaro, Staten Island, NY (US); Eric Rosenberg, Lincroft, NJ (US); Mark Richard Sundt, Red Bank, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,986

(22) Filed: Aug. 13, 2013

(65) Prior Publication Data
US 2013/0329737 A1  Dec. 12, 2013

Related U.S. Application Data

(63) Continuation of application No. 12/967,968, filed on Dec. 14, 2010, now Pat. No. 8,514,859.

(51) Int. Cl.
*H04L 12/28* (2006.01)
*H04L 12/707* (2013.01)
*H04L 12/723* (2013.01)

(52) U.S. Cl.
CPC .................. *H04L 45/22* (2013.01); *H04L 45/50* (2013.01)
USPC ............ 370/389; 370/351; 370/392; 370/473

(58) Field of Classification Search
None
See application file for complete search history.

(56) References Cited

U.S. PATENT DOCUMENTS

| | | | |
|---|---|---|---|
| 5,034,945 A | 7/1991 | Kimoto et al. |
| 5,883,891 A | 3/1999 | Williams et al. |
| 6,704,283 B1 | 3/2004 | Stiller et al. |
| 7,010,471 B2 | 3/2006 | Rosenberg |
| 7,359,988 B2 | 4/2008 | Kim et al. |

(Continued)

OTHER PUBLICATIONS

Atlas et al., "Basic Specification for IP Fast Reroute: Loop-Free Alternates," RFC: 5286, IETF Trust, Network Working Group, Standards Track, Sep. 2008 (32 pages).

(Continued)

*Primary Examiner* — Bunjob Jaroenchonwanit
(74) *Attorney, Agent, or Firm* — Hanley, Flight & Zimmerman, LLC (57) ABSTRACT

Methods and apparatus to determine an alternate route in a network are disclosed. Example methods disclosed herein include processing a label stack of a data packet at a first node to determine whether the data packet is undergoing alternative routing to a destination. Such example methods also include, in response to determining that the data packet is undergoing alternative routing, processing the label stack to determine multiplicity values for neighbor nodes of the first node, respective ones of the multiplicity values representing respective numbers of times the data packet has been routed to respective ones of the neighbor nodes while undergoing alternative routing to the destination. Such example methods further include updating the label stack to increase a respective multiplicity value associated with the first node prior to routing the data packet from the first node to a first one of the neighbor nodes selected based on the multiplicity values.

20 Claims, 7 Drawing Sheets

(56) References Cited

U.S. PATENT DOCUMENTS

| | | |
|---|---|---|
| 7,471,668 B2 | 12/2008 | Qin et al. |
| 7,477,640 B2 | 1/2009 | Oguchi et al. |
| 7,502,314 B2 | 3/2009 | Shimizu |
| 7,532,629 B2 | 5/2009 | Ebata |
| 7,535,838 B1 | 5/2009 | Mitchell et al. |
| 8,059,562 B2 | 11/2011 | Iyer et al. |
| 8,175,079 B2 | 5/2012 | Alapuranen et al. |
| 8,213,432 B2 | 7/2012 | Takemura et al. |
| 8,391,255 B2 | 3/2013 | Ribiere et al. |
| 2004/0236762 A1 | 11/2004 | Chaudhuri et al. |
| 2006/0142913 A1 | 6/2006 | Coffee et al. |
| 2006/0176901 A1 | 8/2006 | Terai et al. |
| 2008/0037560 A1 | 2/2008 | Jia et al. |
| 2008/0192764 A1 | 8/2008 | Arefi et al. |
| 2008/0310340 A1 | 12/2008 | Isozu |
| 2008/0316920 A1 | 12/2008 | Chun et al. |
| 2010/0189113 A1 | 7/2010 | Csaszar et al. |
| 2010/0278140 A1 | 11/2010 | Smith et al. |
| 2011/0305169 A1 | 12/2011 | Karuppiah et al. |
| 2012/0147883 A1 | 6/2012 | Uttaro et al. |

OTHER PUBLICATIONS

Filsfils, Clarence et al., "LFA Applicability in SP Networks," IETF Trust, Network Working Group, Internet-Draft, draft-ieft-rtgwg-lfa-applicability-OO, Aug. 2010 (29 pages).

Gonfa, Lemma Hundessa, "Fast Rerouting Mechanism," Chapter 3 in "Enhanced Fast Rerouting Mechanisms for Protected Traffic in MPLS Networks," Thesis, Universitat Politecnica de Catalunya, Mar. 4, 2003 (16 pages).

Previdi, Stefano, "IP Fast ReRoute Technologies," 2008 Cisco Systems, Inc. (60 pages).

Shand et al., "IP Fast Reroute Framework," RFC: 5714, IETF Trust, Network Working Group, Standards Track, Jan. 2010 (16 pages).

USPTO, "Notice of Allowance," issued in connection with U.S. Appl. No. 12/967,968, dated Apr. 23, 2013 (10 pages).

METHODS AND APPARATUS TO DETERMINE AN ALTERNATE ROUTE IN A NETWORK

RELATED APPLICATION(S)

This patent arises from a continuation of U.S. patent application Ser. No. 12/967,968 (now U.S. Pat. No. 8,514,859), entitled "METHODS AND APPARATUS TO DETERMINE AN ALTERNATE ROUTE IN A NETWORK" and filed on Dec. 14, 2010.U.S. patent application Ser. No. 12/967,968 is hereby incorporated by reference in its entirety, and priority to the above-referenced application is hereby claimed.

FIELD OF THE DISCLOSURE

This disclosure relates generally to networks and, more particularly, to methods and apparatus to determine an alternate route in a network.

BACKGROUND

Alternative routing techniques are used in modern data networks to route a data packet to a destination using an alternate (e.g., backup) route when, for example, a link along a primary route to the destination becomes unavailable. For example, multiprotocol label switching (MPLS) networks can employ fast rerouting (FRR) techniques to route a data packet along an alternate route towards a destination. One such FRR technique involves configuring the network nodes (e.g., which may be routers, such as provider (P) routers, provider edge (PE) routers, etc.) to have both primary and backup routes (e.g., tunnels) between the possible sources and destinations in the network. Another such FRR technique involves using the routing protocol (such as an interior gateway protocol (IGP), which is a class of routing protocols) for determining the primary route from a network node to a destination to also attempt to find another (e.g., loop free alternative (LFA)) route to the destination.

DETAILED DESCRIPTION

Methods and apparatus to determine an alternate in a network are disclosed herein. An example method disclosed herein to route a data packet to a destination in a network includes a current node (e.g., router) in the network determining that a primary route for routing the data packet to the destination is unavailable (e.g., by determining that the next hop link has failed), or that the data packet is already being routed along an alternate route to the destination (e.g., due to a previous node detecting unavailability of the primary route). The example method then includes identifying a set of neighbor nodes of the current node, and determining multiplicity values for this set of neighbor nodes. As described in greater detail below, a multiplicity value for a respective node in the set of neighbor nodes represents a number of times the data packet has been routed to the respective neighbor node (e.g., along an alternate route towards the destination). The example method further includes selecting, based on the multiplicity values, one neighbor node from the set of neighbor nodes to which to send the data packet to route the data packet to the destination.

In some examples, the multiplicity values for the set of neighbor nodes are determined by processing labels included in a routing label stack of the data packet, as described in greater detail below. Also, in some examples a neighbor node having the minimum multiplicity among the set of neighbor nodes is selected to be the neighbor node to which the data packet is sent to continue routing the data packet to the destination. If multiple neighbor nodes have the same minimum multiplicity value, routing costs can be further used to select the neighbor node to which the data packet is to be sent, as described in greater detail below.

Figure 1:
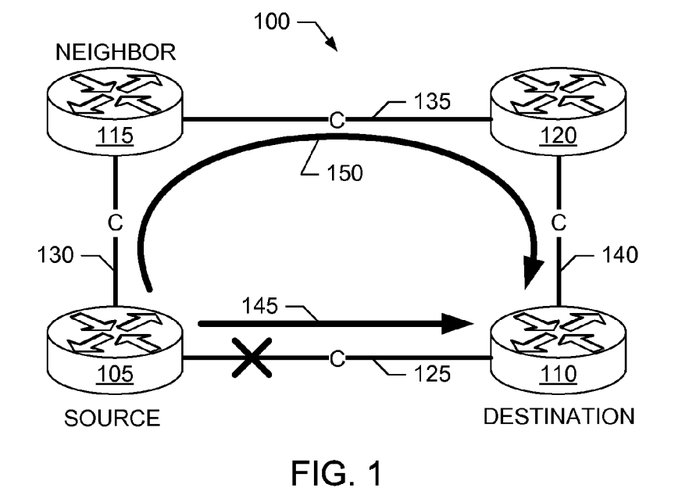
FIG. 1 illustrates an alternate route in an example network.

Turning to the figures, a block diagram of an example network 100 supporting alternative routing is illustrated in FIG. 1. The network 100 includes an example source node 105 that is to route a data packet to an example destination node 110. The example network 100 also includes nodes 115 and 120 communicatively coupling the source node 105 and the destination node 110 as shown. The nodes 105-120 can correspond to any type of network node. For example, one or more of the nodes 105-120 could correspond to one or more provider (P) routers, provider edge (PE) routers, etc. In some examples, one or more of the nodes 105-120 could be implemented by a processing system such as the example processing system 800 illustrated in FIG. 8, which is described in greater detail below.

The example network 100 of FIG. 1 is arranged in a topology such that the source node 105 is communicatively coupled with the destination node 110 via an example link 125. Similarly, the source node 105 is coupled to the node 115 via an example link 130, the node 115 is coupled with the node 120 via an example link 135, and the node 120 is coupled with the destination node 110 via a link 140. As such, the destination node 110 and the node 115 are neighbor nodes of the source node 115, the source node 105 and the node 120 are neighbor nodes of the node 115, and the destination node 110 and the node 115 are neighbor nodes of the node 120.

The links 125-140 could be implemented using any type of communication interface or connection (e.g., which may be physical, logical, etc., and/or any combination thereof), and can support any type of routing protocol. Also, the links 125-140 each have an associated distance, or routing cost. In some examples, the link distances/routing costs are determined using a routing protocol, such as an interior gateway protocol (IGP). Example IGPs include, but are not limited to, the open shortest path first (OSPF) protocol, the intermediate system to intermediate system (IS-IS) protocol, etc. In the illustrated example, each of the links 125-140 has the same distance (or routing cost), which is denoted by the letter "C"

in FIG. 1. As such, the topology of the network 100 is referred to as, for example, a uniform cost topology, a box topology, etc.

In the illustrated example of FIG. 1, the source node 105 usually sends data packets to the destination node 110 via a primary route 145 (also referred to as a primary tunnel 145) via the link 125. For example, one or more routing tables in the source node 105 may be configured with the primary route 145 for routing data packets from the source node 105 to the destination node 110. However, in the illustrated example, the source node 105 detects that the link 125 is unavailable (illustrated in FIG. 1 as an "X" through the link 125). For example, the link 125 may be unavailable due to link failure, maintenance, etc. It is also feasible that, in some examples, detection of the link's capacity being exceeded could result in the link 125 being deemed unavailable.

When the link 125 is determined to be unavailable, the source node 105 can use an alternate route 150 (also referred to an alternate tunnel 150, a backup tunnel 150, etc.) to enable a data packet to still be routed from the source node 105 to the destination node 110. For example, one or more routing tables in the source node 105 may be configured with the alternate route 150 as a backup for routing data packets from the source node 105 to the destination node 110. For a network having N nodes, the complexity of configuring primary and alternate routes at each of the nodes is on the order of $N^2$, denoted $O(N^2)$, because every node could potentially be a source and a destination of data packets. As such, configuring the nodes 105-120 with primary and alternate routes for use during alternative routing can be computationally difficult and may not scale as the number of nodes 105-120 increases.

Figure 2:
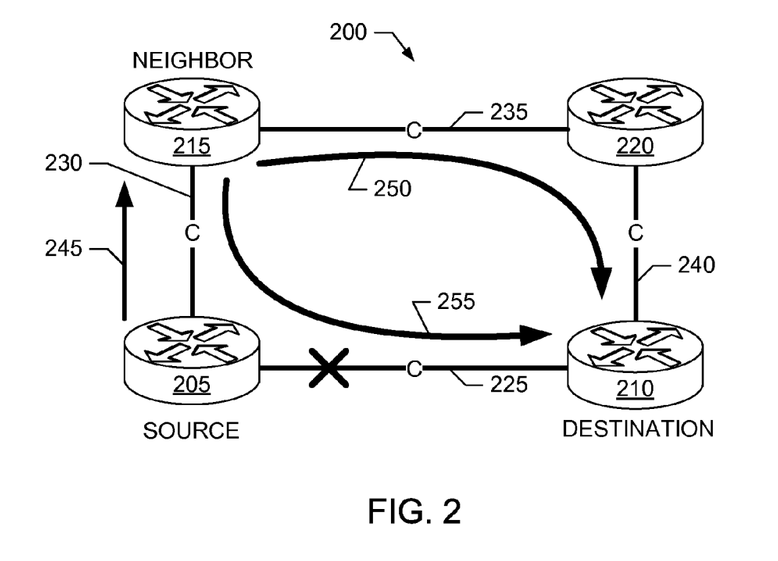
FIG. 2 is block diagram of an example network in which a neighbor node is unable to determine a loop free alternative (LFA) route to a destination.

FIG. 2 illustrates an example network 200 that is also able to support alternative routing. The network 200 of FIG. 2 includes example nodes 205, 210, 215 and 220 corresponding or similar to the example nodes 105, 110, 115 and 120 of FIG. 1, and example links 225, 230, 235 and 240 corresponding or similar to the example links 125, 130, 135 and 140. As in the example of FIG. 1, in the illustrated example of FIG. 2 the example source node 205 is to route a data packet via the link 225 to the example destination node 210, but the link 225 is unavailable (illustrated in FIG. 2 as an "X" through the link 225). However, instead of being configured with primary and alternate routes between possible sources and destinations, the nodes 225-240 determine alternate routes using the routing protocol, such as IGP, for determining the primary (e.g., best) routes in the network, but augmented to also determine alternate (e.g., backup) routes (e.g., the second best route, third best route, etc.) to destinations in the network.

For example, in FIG. 2, IGP determines that a next-hop route 245 to the neighbor node 215 is in the alternate route for routing a data packet from the source node 205 to the destination node 210 when the link 225 is unavailable. Accordingly, in the illustrated example, the source node 205 sends the data packet to neighbor node 215 via the route 245 over link 230. Next, the neighbor node 215 is to continue routing the data packet to the destination node 210. However, because information concerning link unavailability takes time to propagate through the network 200, the neighbor node 215 may not be aware that the link 225 is unavailable. Instead, the neighbor node 215 may attempt to route the data packet along its primary (e.g., best route) towards the destination node 210. In some examples, the neighbor node 215 can be guaranteed to route the data packet to the destination node 210 via a loop free alternative (LFA) route (e.g., that will not return the data packet to the source node 205 for routing via the unavailable link 225) if the LFA inequality of Equation 1 is satisfied:

$$\text{Dist}(N, D) < \text{Dist}(N, S) + \text{Dist}(S, D). \qquad \text{Equation 1}$$

In Equation 1, Dist(N, D) is the distance (or routing cost) from the neighbor node 215 to the destination node 210, Dist(N, S) is the distance (or routing cost) from the neighbor node 215 to the source node 205, and Dist(S, D) is the distance (or routing cost) from the source node 205 to the destination node 210.

In the illustrated example FIG. 2, however, the LFA inequality of Equation 1 is not satisfied and, thus, the neighbor node is unable to determine an LFA route to the destination node 210. The network 200 has a uniform cost topology (or box) topology in which each of the links 225-240 has the same distance (or routing cost), which is denoted by the letter "C" in FIG. 2. As such, the Dist(N, D) from the neighbor node 215 to the destination node 210 (e.g., along the route 250) is 2C, which is the same as the sum of the Dist(N, S) from the neighbor node 215 to the source node 205 and the Dist(S, D) from the source node 205 to the destination node 210 (e.g., along the route 255). Because the LFA inequality of Equation 1 is not satisfied, the neighbor node 215 could select the route 255 instead of the route 250 for routing the data packet to the destination node 210. However, if the neighbor node 215 selects the route 255, the data packet will not reach the destination node 210 because the link 225 is unavailable.

Figure 3:
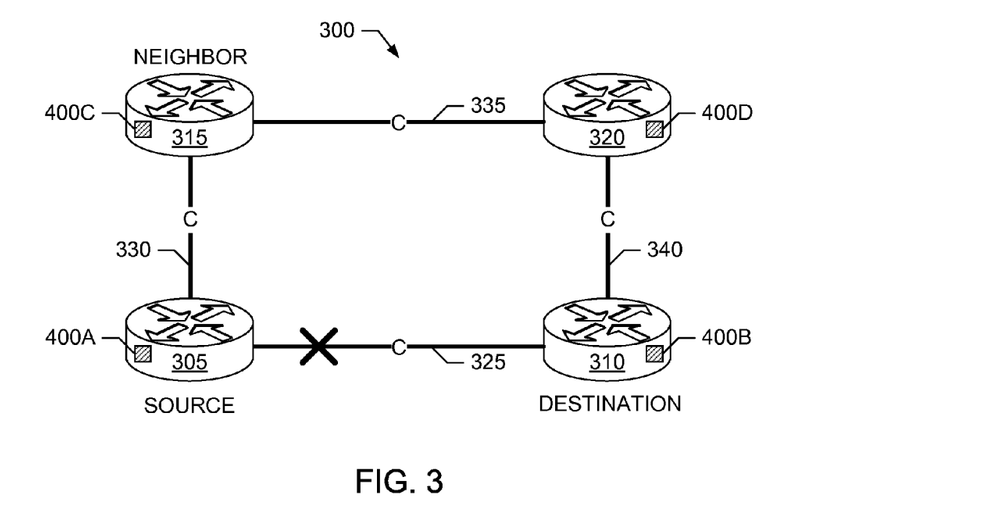
FIG. 3 is block diagram of an example network supporting multiplicity-based alternative routing in accordance with the example methods and apparatus described herein.

An example network 300 supporting multiplicity-based alternative routing in accordance with the example methods and apparatus described herein is illustrated in FIG. 3. The network 300 of FIG. 3 includes example nodes 305, 310, 315 and 320 corresponding or similar to the example nodes 105, 110, 115 and 120 of FIG. 1 and/or the example nodes 205, 210, 215 and 220 of FIG. 2. The network 300 of FIG. 3 also includes example links 325, 330, 335 and 340 corresponding or similar to the example links 125, 130, 135 and 140 of FIG. 1 and/or the example links 225, 230, 235 and 240 of FIG. 2.

However, unlike the network 100 of FIG. 1, the network 300 of FIG. 3 does not rely on configuring primary and alternate routes between possible sources and destinations at each node 305-320 to implement alternative routing. As such, the network 300 of FIG. 3 avoids the $O(N^2)$ complexity discussed above for configuring alternative routing as in the network 100. Also, unlike the network 200 of FIG. 2, the network 300 of FIG. 3 does not rely on LFA routing for determining alternate routes and, thus, can perform alternative routing even when the LFA inequality of Equation 1 is not satisfied.

Instead, the network 300 employs multiplicity-based alternative routing in which routing decisions are based on multiplicity values representing the number of times a given data packet has been routed to (e.g., has visited) different nodes along an alternate route from, for example, the source node 305 to the destination node 310. In some examples, multiplicity-based alternative routing as performed in the network 300 also uses distances, or routing costs, along with the multiplicity values when making alternative routing decisions. In the illustrated example of FIG. 3, the nodes 305, 310, 315 and 320 include respective instances 400A, B, C and D of an example alternate routing processor to implement multiplicity-based alternative routing in accordance with the example methods and apparatus described herein.

Figure 4:
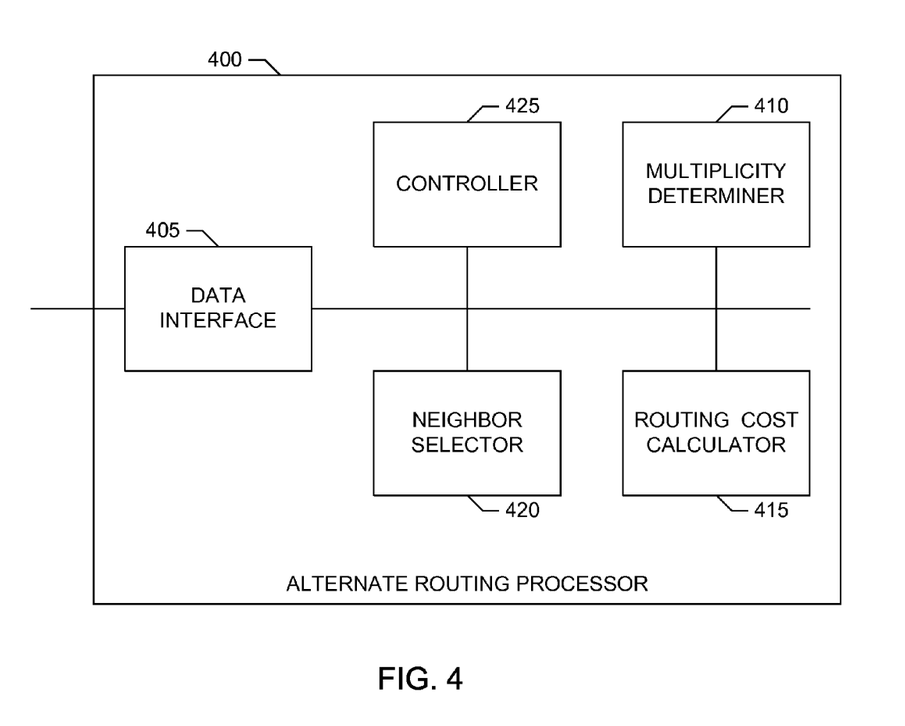
FIG. 4 illustrates an example alternate routing processor that may be used to perform multiplicity-based alternative routing in the example network of FIG. 3.

An example alternate routing processor 400 that may be used to implement one or more of the alternate routing processors 400A-D of FIG. 3 is illustrated in FIG. 4. The alternate routing processor 400 of the illustrated example includes an example data interface 405 to receive and send data packets for routing to a destination, such as the destination node 310 of FIG. 3. The data interface 405 can be implemented using any type of interface capable of exchanging data packets and/or other digital data. For example, the data interface 405 could be implemented by the interface circuit 824 included in the example processing system 800 of FIG. 8, which is described in greater detail below.

The alternate routing processor 400 of FIG. 4 also includes an example multiplicity determiner 410 to determine multiplicity values for a set of neighbor nodes to which a received data packet could be sent. As described in greater detail below, in some examples the multiplicity determiner 410 processes labels included in a label stack associated with the received data packet to determine the multiplicity values for the set of neighbor nodes. For example, some routing protocols, such as multiprotocol label switching (MPLS), employ labels to route data packets in a network, such as the network 300. The routing labels can uniquely identify nodes in the network. In such examples, alternate routing labels (also referred to as backup routing labels) can be assigned to the network nodes to identify the network nodes and to indicate that a data packet is being routed along an alternate route (e.g., due to unavailability of a link along a primary route to a destination). The alternate routing labels can then be added to a label stack associated with (e.g., included in) the data packet to indicate that the data packet is being routed along an alternate route, and to identify the nodes visited by the data packet along this alternate route. In such examples, the multiplicity determiner 410 can process the alternate routing labels (e.g., by counting the alternate routing labels, evaluating fields of the alternate routing labels, etc.) to determine the multiplicity values of the set of neighbor nodes.

In some examples, the alternate routing processor 400 of FIG. 4 includes an example routing cost calculator 415 to determine routing costs (e.g., also referred to as routing distances) associated with selecting among different neighbor nodes to define the next link to route the received data packet to a destination along an alternate route. As described in greater detail below, the routing cost (e.g., $c(x, d)$) determined by the routing cost calculator for a particular neighbor node (e.g., such as for the neighbor node 315 of FIG. 3) can be a combination (such as a sum) of the routing cost (e.g., $c(x, y)$) of sending the data packet from the current node (e.g., x, such as the source node 305) to the neighbor node (e.g., y, such as the neighbor node 315), and the routing cost (e.g., $c^*(y, d)$) as determined by a routing protocol (such as one of the IGP class of protocols, e.g., OSPF, IS-IS, etc.) for routing the data packet from the neighbor node (e.g., y, such as the neighbor node 315) to the destination node (e.g., d, such as the destination node 310).

The alternate routing processor 400 of FIG. 4 further includes an example neighbor selector 420 to select a particular neighbor node from the set of neighbor nodes to which to send a received data packet for alternate routing to a destination. In some examples, the neighbor selector 420 selects the particular neighbor node based on the multiplicity values determined by the multiplicity determiner 410, and possibly the routing costs determined by the routing cost calculator 415. For example, the neighbor selector 420 may select the neighbor node from the set of neighbor nodes having a minimum multiplicity value as determined by the multiplicity determiner 410. If only one neighbor node has the minimum multiplicity value, the neighbor selector 420 selects this neighbor node. However, if multiple neighbor nodes have the same, minimum multiplicity value, the neighbor selector 420 can use the routing costs (e.g., $c(x, d)$) determined by the routing cost calculator 415 to break the tie (e.g., by selecting the neighbor node with the minimum multiplicity value and the lowest routing cost $c(x, d)$).

Figure 5A:
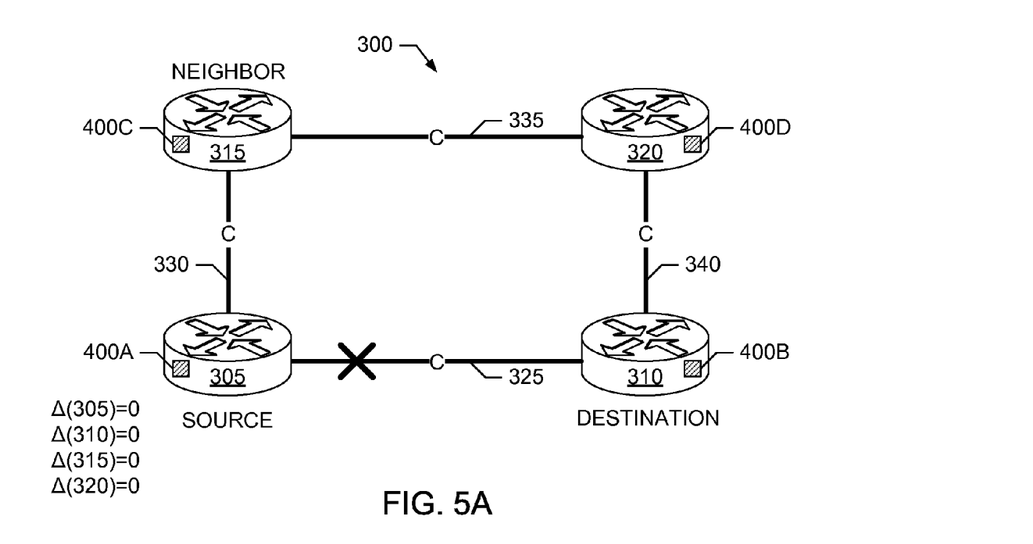
FIGS. 5A-C collectively illustrate example operation of the alternate routing processor of FIG. 4 in the network of FIG. 3.
Figure 5B:
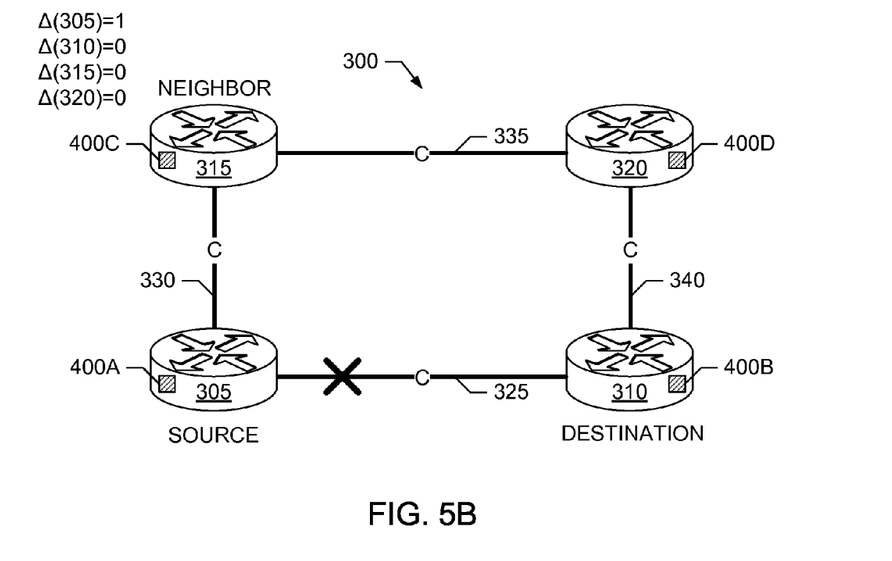
Figure 5C:
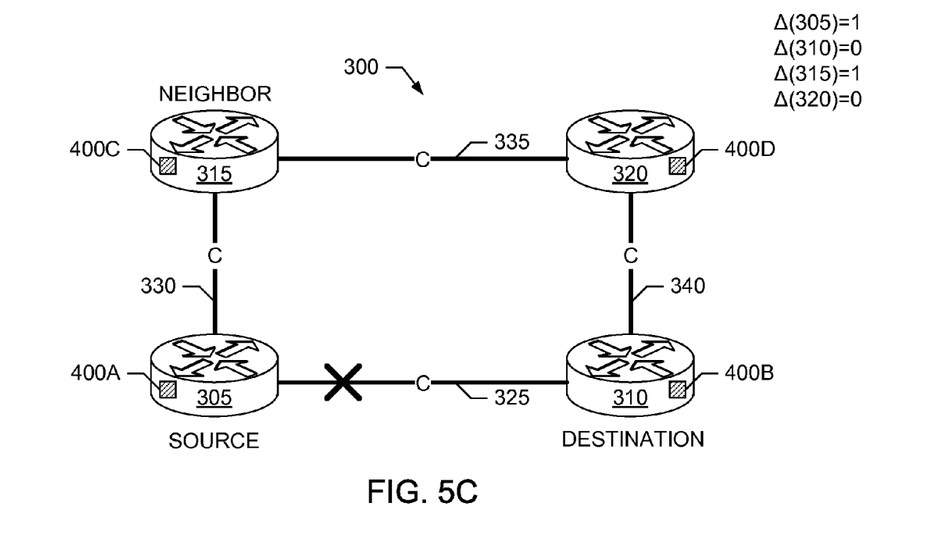
Figure 6:
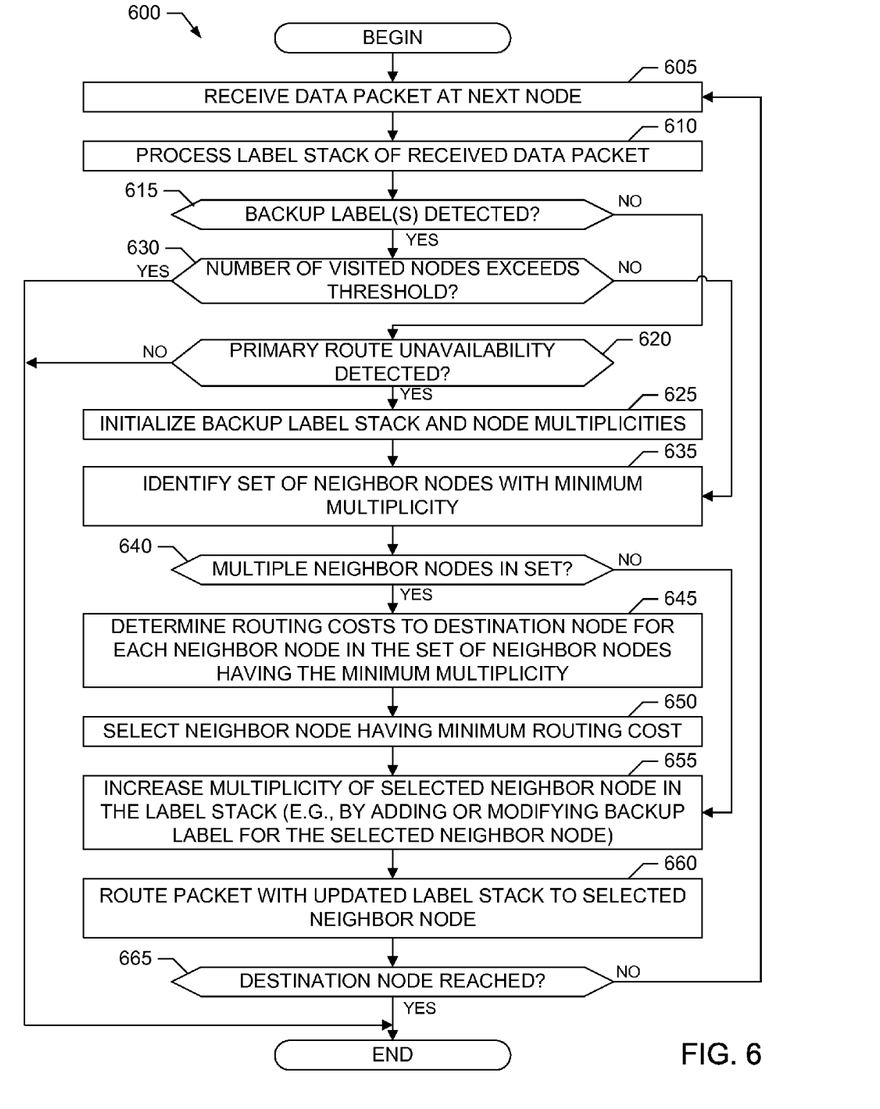
FIG. 6 is a flowchart representative of example machine readable instructions that may be executed to implement the alternate routing processor of FIG. 4.

The alternate routing processor 400 of FIG. 4 additionally includes a controller 425 to control operation of the alternate routing processor 400, as described in greater detail below. Example operation of the alternate routing processor 400 of FIG. 4 in the network 300 is illustrated in FIGS. 5A-C. Example machine readable instructions that may be used to implement the alternate routing processor 400 of FIG. 4 are illustrated in FIG. 6 and in Table 1.

Turning to FIGS. 5A-C, each alternate routing processor 400A-D in the illustrated examples is implemented by a respective instance of the alternate routing processor 400 of FIG. 4. Like elements in FIGS. 3 and 5A-C are labeled with the same reference numerals. FIGS. 5A-C also depict the multiplicity values of the nodes 305-320 at different phases of the alternate routing operation. In FIGS. 5A-C, the multiplicity value of the node 305 is denoted by $\Delta(305)$, the multiplicity value of the node 310 is denoted by $\Delta(310)$, the multiplicity value of the node 315 is denoted by $\Delta(315)$, and the multiplicity value of the node 320 is denoted by $\Delta(320)$.

Beginning with FIG. 5A, the source node 305 is to route a data packet to the destination node 310. The alternate routing processor 400A of the source node 305 detects that the link 325 is unavailable. After detecting that the link 325 is unavailable, the alternate routing processor 400A examines the multiplicity values of the set of available neighbor nodes, which is the neighbor node 315 in the illustrated example. Upon initial detection of the link 325 being unavailable, the multiplicity value of each node 305-320 is zero. Here, the neighbor node 315 is the only neighbor node in the set and, thus, by default it has the minimum multiplicity value. As such, the alternate routing processor 400A selects the neighbor node 315 to which to send the data packet. Because the data packet has visited the source node 305, the multiplicity value $\Delta(305)$ is incremented by 1.

Accordingly, in FIG. 5B the node 315 receives the data packet and its alternate routing processor 400C determines that the multiplicity of its neighbor node 305 (i.e., the source node 305) is one, whereas the multiplicity of its other neighbor node 320 is zero. As such, the alternate routing processor 400C selects the neighbor node 320, which has the minimum multiplicity value of zero, to which to send the data packet from routing to the destination node 310. Also, because the data packet has visited the node 315, the multiplicity value $\Delta(315)$ is incremented by 1.

Accordingly, in FIG. 5C the node 320 receives the data packet and its alternate routing processor 400D determines that the multiplicity of its neighbor node 315 is one, whereas the multiplicity of its other neighbor node 310 (i.e., the destination node 310) is zero. As such, the alternate routing processor 400D selects the node 310, which has the minimum multiplicity value of zero, to which to send the data packet. Also, because the data packet has visited the node 320, the multiplicity value $\Delta(320)$ is incremented by 1. Alternative routing then ends because the data packet has reached the destination node 310. As illustrated in FIGS. 5A-C, multiplicity-based alternative routing in the network 300 is successful even though the LFA inequality of Equation 1 was not satisfied at node 315.

While an example manner of implementing the alternate routing processors 400A-D of FIG. 3 has been illustrated by the example alternate routing processor 400 in FIG. 4, one or more of the elements, processes and/or devices illustrated in FIG. 4 may be combined, divided, re-arranged, omitted, eliminated and/or implemented in any other way. Further, the example data interface 405, the example multiplicity determiner 410, the example routing cost calculator 415, the example neighbor selector 420, the example controller 425 and/or, more generally, the example alternate routing processor 400 of FIG. 4 may be implemented by hardware, software, firmware and/or any combination of hardware, software and/or firmware. Thus, for example, any of the example data interface 405, the example multiplicity determiner 410, the example routing cost calculator 415, the example neighbor selector 420, the example controller 425 and/or, more generally, the example alternate routing processor 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example alternate routing processor 400, the example data interface 405, the example multiplicity determiner 410, the example routing cost calculator 415, the example neighbor selector 420 and/or the example controller 425 are hereby expressly defined to include a tangible computer readable medium such as a memory, digital versatile disk (DVD), compact disk (CD), etc., storing such software and/or firmware. Further still, the example alternate routing processor 400 of FIG. 4 may include one or more elements, processes and/or devices in addition to, or instead of, those illustrated in FIG. 4, and/or may include more than one of any or all of the illustrated elements, processes and devices.

Flowcharts and pseudocode representative of example machine readable instructions that may be executed to implement the example network 300, one or more of the example nodes 305-320, one or more of the example alternate routing processors 400 and/or 400A-D, the example data interface 405, the example multiplicity determiner 410, the example routing cost calculator 415, the example neighbor selector 420 and/or the example controller 425 are shown in FIG. 6 and Table 1. In these examples, the machine readable instructions represented by the flowchart and pseudocode may comprise one or more programs for execution by a processor, such as the processor 812 shown in the example processing system 800 discussed below in connection with FIG. 8. Alternatively, the entire program or programs and/or portions thereof implementing one or more of the processes represented by the flowchart and pseudocode of FIG. 6 and Table 1 could be executed by a device other than the processor 812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart and pseudocode of FIG. 6 and Table 1 may be implemented manually. Further, although the example machine readable instructions are described with reference to the flowchart and pseudocode of FIG. 6 and Table 1, many other techniques for implementing the example methods and apparatus described herein may alternatively be used. For example, with reference to the flowchart and pseudocode of FIG. 6 and Table 1, the order of execution of the blocks/lines may be changed, and/or some of the blocks/lines described may be changed, eliminated, combined and/or subdivided into multiple blocks/lines.

As mentioned above, the example processes of FIG. 6 and Table 1 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 6 and Table 1 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 600 that may be executed to implement the example alternate routing processor 400 of FIG. 4 are illustrated in FIG. 6. Example pseudocode corresponding, at least in part, to the example machine readable instructions 600 of FIG. 6 and that may be used to implement the example alternate routing processor 400 of FIG. 4 is illustrated in Table 1. The example pseudocode of Table 1 implements a procedure to determine an alternate route from a source node s to a destination node d. For clarity, the machine readable instructions 600 of FIG. 6 and the pseudocode of Table 1 are described in parallel, and with reference to FIGS. 3, 4 and 5A-C.

TABLE 1

```
procedure Route (s, d)
1    initialize: Set L = Ø, Δ (n) = 0 for n ∈ N, and x = s;
2    while (x ≠ d) {
3        Let Y = {y ∈ N (x) | Δ (y) = min_{n ∈ N} Δ (n)};
4        Pick any y ∈ Y for which the sum c (x, y) + c* (y, d) is
         smallest;
5        Set Δ (x) ← Δ (x) + 1, L ← L ∪ {x}, and send the packet and
         L from x to y;
6        Set x ← y;
7    }
```

Before proceeding with a description of the example machine readable instructions 600 and the pseudocode of Table 1, the mathematical notation used in the pseudocode is developed as follows. Let G=(N, A) be a connected graph (e.g., representing a network, such as the network 300) with node set G (e.g., corresponding to the nodes 305-320) and arc set A (e.g., corresponding to the links 325-340). For a node x ∈ N, let N (x) be the set of neighbors of x, where a neighbor of x is a node that is one arc (e.g., one link) away from x. Each arc (i, j) ∈ A has a cost c(i, j) (e.g., which may the same or different in the two directions i to j, or j to i). In some examples, c(i, j) is restricted to be a positive integer. (For example, such an integer valued restriction can be met by approximating, to the desired accuracy, each arc cost by an improper fraction, and then multiplying the fractions by the least common multiple of the fraction denominators.) For each arc i, j ∈ A, let c*(i, j) be the cost of the shortest path (e.g., route) in the graph (e.g., network) G between nodes i and j. Let s be a given source node, and d be a given destination node.

Figure 7A:
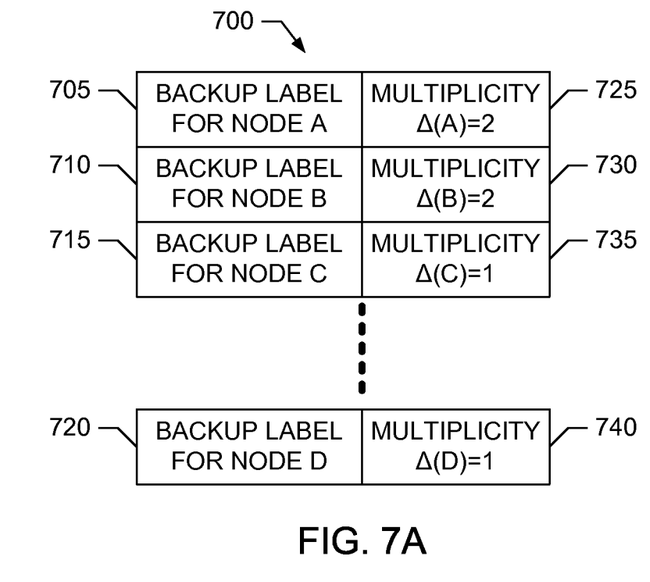
FIGS. 7A-B illustrate example backup routing label stacks that may be used by the alternate routing processor of FIG. 4 to perform alternative routing in the network of FIG. 3.
Figure 7B:
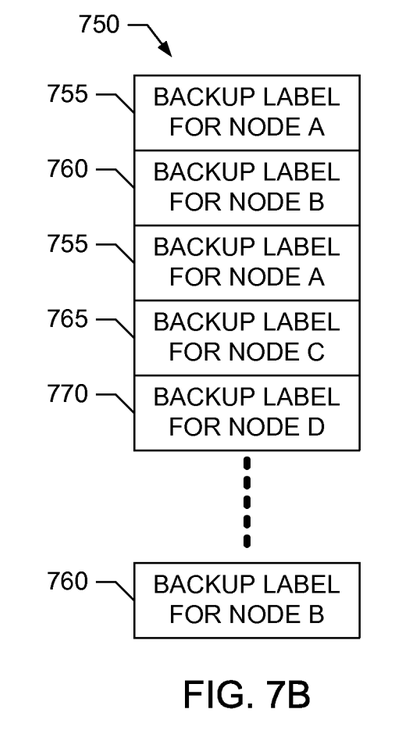

Turning to FIG. 6, and given the foregoing description of the notation used in Table 1, the example machine readable instructions 600 begin execution at block 605 at which the data interface 405 of the alternate routing processor 400 of a next network node (e.g., the source node 305) along a route to a destination node (e.g., the destination node 310) receives a data packet. At block 610, the controller 425 of the alternate routing processor 400 processes a routing label stack included with the data packet received at block 605. Examples of routing label stacks capable of being processed at block 610 are illustrated in FIGS. 7A-B, which are described below.

At block 615, the controller 425 determines whether the routing label stack of the received data packet includes one or more backup labels. As described above, in some examples backup labels are assigned to the nodes in a network to uniquely identify the nodes and to indicate that a data packet is already being routed along an alternate route to a destination. If no backup labels are included in the label stack (block 615), the data packet is not currently undergoing alternative routing and at block 620 the controller 425 determines whether a primary (or other particular) route (e.g., as computed by an IGP) towards the destination is unavailable. If the primary route is not unavailable (or, in other words, if the primary route is available) (block 620), then no alternative routing is to be performed. Execution of the example machine readable instructions 600 ends.

However, if the primary route is unavailable (block 620), then at block 625 the controller 425 can initialize a backup label stack to be included with the data packet received at block 605 as it is routed to the destination. At block 625, the controller 425 also initializes the multiplicity values for the set of neighbor nodes of the current node. For example, at block 625 the controller 425 can invoke the pseudocode of Table 1 to perform alternative routing, and perform line 1 at which: (i) the label stack L is initialized (e.g., L=Ø); (ii) the multiplicity values for the set of neighbor nodes are set to zero (e.g., $\Delta(n)=0$ for $n \in N$); and (iii) the current node (x) is set to be the source node (s) (e.g., corresponding to the source node 305) from which alternative routing is to begin.

Returning to block 615, if backup labels are in the label stack, the data packet is currently undergoing alternative routing and at block 630 the controller 425 determines whether a number of nodes already visited by the received data packet along the alternate route exceeds a threshold. If the number of visited nodes exceeds the threshold (block 630), the controller 425 determines that an alternate route does not exist (or is too long or incurs too much delay to be of use) and, thus, execution of the example machine readable instructions 600 ends.

However, if the number of visited nodes does not exceed the threshold (block 630), or initialization of the alternative routing process is complete (block 625), at block 635 the multiplicity determiner 410 determines the multiplicity values for the neighbor nodes of the current node and identifies or otherwise determines a set of neighbor nodes having, for example, a minimum multiplicity value (or some other multiplicity value). For example, the processing at block 635 can correspond to the processing at line 3 of the pseudocode of Table 1. In line 3 of Table 1, Y (a set of neighbor nodes) is set equal to those nodes (y) in the neighbors set N (x) having the minimum multiplicity value (e.g., such that $\Delta(y)=\min_{n \in N}\Delta(n)$).

At block 640, the controller 425 determines whether the set of neighbor nodes having the minimum multiplicity value includes multiple neighbor nodes. If the set of neighbor nodes (Y) includes multiple neighbor nodes (block 640), at block 645 the controller 425 invokes the routing cost calculator 415 to determine routing costs for routing the data packet received at block 605 to the destination via each one of the neighbor nodes included in the set of neighbor nodes determined at block 635 as having the minimum multiplicity value. For example, the processing at block 645 can correspond to the processing at line 4 of the pseudocode of Table 1 at which the routing cost for a particular neighbor node (y) in the set of neighbor nodes with minimum multiplicity is determined by summing (i) the routing cost c(x, y) for routing the data packet from the current node (x) to a particular neighbor node (y); and (ii) the routing cost c*(y, d) for routing the data packet from the particular neighbor node (y) to the destination node (d). In some examples, the routing costs c(x, y) and c*(y, d) are determined in accordance with an IGP, such as OSPF, IS-IS, etc.

At block 650, the neighbor selector 420 selects the neighbor node with, for example, the minimum routing cost (or some or routing cost) from the set of neighbor nodes with minimum multiplicity. In other words, at block 650 the neighbor selector 420 can select the neighbor node having both the minimum multiplicity value and the minimum routing cost. For example, the processing at block 645 can correspond to the processing at line 4 of the pseudocode of Table 1 at which the node (y) having the smallest cost from among the set of neighbor nodes (Y) is picked.

After the neighbor node is selected at block 650, or if the set of neighbor nodes with minimum multiplicity does not include multiple nodes (block 640) and, thus, has only one node which is selected by default, processing proceeds to block 655. At block 655, the controller 425 increases the multiplicity value of the current node (e.g., to indicate that the received data packet has visited the current node). In some examples, the controller 425 can add another backup label corresponding to the current node to the label stack of the data packet to increase the current node's multiplicity value. Additionally or alternatively, in some examples the controller 425 can modify (e.g., increment) a field of the current node's backup label that represents the multiplicity value of the current node. At block 660, the data packet, with its updated label stack, is sent to the selected neighbor node for routing to the destination. In some examples, the processing at blocks 655 and 660 corresponds to the processing at line 5 of the pseudocode of Table 1 at which the multiplicity value ($\Delta(x)$) of the current node (x) is incremented by one ($\Delta(x) \leftarrow \Delta(x)+1$), the backup label for the current node (x) is added to the label stack ($L \leftarrow L \cup \{x\}$), and the data packet and label stack (L) are sent from the current node (x) to the selected neighbor node (y).

At block 665, the controller 425 of the next neighbor node that receives the data packet (e.g., the selected neighbor node to which the data packet was sent at block 660) determines whether the destination has been reached. If the destination has not been reached (block 665), processing returns to block 605 and blocks subsequent thereto at which the alternate routing processor 400 of the next network node continues to perform alternative routing of the data packet. For example, the processing at block 665 can correspond to the processing at lines 2 and 6 of the pseudocode of Table 1. However, if the destination has been reached (block 665), execution of the example machine readable instructions ends.

FIGS. 7A-B illustrate two example label stacks that can be utilized by the example multiplicity-based alternative routing techniques described herein. FIG. 7A illustrates a first example label stack 700 including backup labels 705, 710, 715 and 720 corresponding, respectively, to example nodes A, B, C and D of an example network. In the illustrated example, the backup labels 705, 710, 715 and 720 identify their respective nodes A, B, C and D and indicate that the data packet associated with these labels is undergoing alternative routing (e.g., is already being routed along an alternate route from a source to a destination). Additionally, the backup labels 705, 710, 715 and 720 include respective multiplicity fields 725, 730, 735 and 740 to store the current multiplicity values of the respective nodes A, B, C and D. In examples employing the label stack 700 of FIG. 7A, the alternate routing processor 400 can modify the multiplicity field 725, 730, 735 or 740 of a particular backup label 705, 710, 715 or 720 for a particular one of the nodes A, B, C or D to update that node's multiplicity value during alternative routing processing. Similarly, the alternate routing processor 400 can read the multiplicity field 725, 730, 735 or 740 of a particular backup label 705, 710, 715 or 720 for a particular one of the nodes A, B, C or D to read that node's multiplicity value during alternative routing processing.

FIG. 7B illustrates a second example label stack 750 including backup labels 755, 760, 765 and 770 corresponding, respectively, to example nodes A, B, C and D of an example network. In the illustrated example, the backup labels 755, 760, 765 and 770 identify their respective nodes A, B, C and D and indicate that the data packet associated with these labels is undergoing alternative routing (e.g., is already being routed along an alternate route from a source to a destination). However, unlike the label stack 700 of FIG. 7A, the backup labels 755, 760, 765 and 770 included in the label stack 750 of FIG. 7B do not include multiplicity value fields. Instead, to increment the multiplicity value for a particular one of the nodes A, B, C or D, the alternate routing processor 400 adds to the label stack 750 another one of the backup labels 755, 760, 765 or 770 corresponding to the particular node. To determine the multiplicity value for a particular one of the nodes A, B, C or D, the alternate routing processor 400 counts the number of occurrences of the backup label 755, 760, 765 or 770 corresponding to the particular node in the label stack 750.

Both example label stacks 700 and 750 can yield equivalent results. For example, the label stacks 700 and 750 in the illustrated examples both indicate that the multiplicity of node A is 2, the multiplicity of node B is 2, the multiplicity of node C is 1, and the multiplicity of node D is 1. However, in some examples, the label stack 700 can be more compact and, thus, use less memory and transmission bandwidth than the label stack 750. Also, in some examples the label stack 750 can be easier to process, resulting in less processor utilization, and also provide an ordered history of the routing of the data packet along the alternate route.

It can be shown that the Route (s, d) procedure represented by the example pseudocode of Table 1 will converge to an alternate route from the source node (s) to the destination node (d) if any alternate route exists. Assuming that each cost $c(i, j)$ is a positive integer, the convergence proof for the Route (s, d) procedure uses the following definition. For each non-negative integer k, define:

$$N_k = \{n \in N | c^*(n,d) = k\}.$$

Note that $N_0 = \{d\}$ and $N_k$ may be empty for one or more values of k. For example, if each arc cost $c(i,j) \geq 2$, then $N_1 = \emptyset$. Define P to be the route (sequence of nodes) generated by procedure Route (s, d). Note that P may contain cycles (e.g., loops).

Lemma. If P never reaches d, then for $k \geq 1$ the route P, once leaving s, never reaches a node in $N_k$.

Proof. The proof is by induction. Assume P never reaches d, and consider k=1. Clearly P never reaches a node in $N_1$ if it is empty, so assume $N_1 \neq \emptyset$. Suppose P reaches some node $x \in N_1$. If P reaches $N_1$ multiple times, let x be the first such node. Then, d is a neighbor of x (e.g., they are separated by a single arc of cost=1) and $\Delta(d)=0$. If z is any other neighbor of x such that $\Delta(z)=0$, then $c(x, z)+c^*(z, d) > c^*(x, d)=1$, since $c(x, z) > 0$ and $c^*(z, d) \geq 1$. By lines 3 and 4 of the pseudocode of Table 1 for Route (s, t), node x will forward the packet to d, which contradicts the assumption that P never reaches d. Thus P never reaches a node in $N_1$.

Suppose the Lemma holds for $1 \leq k \leq p$ (that is, suppose P never visits a node in $N_k$ for $1 \leq k \leq p$) and consider $N_{p+1}$. Clearly P never reaches a node in $N_{p+1}$ if it is empty, so assume $N_{p+1} \neq \emptyset$. Suppose that P, after leaving s, reaches some node $x \in N_{p+1}$. If P reaches $N_{p+1}$ multiple times, let x be the first such node. Then $c^*(x, d) = p+1$.

Define $Y_1 = \{y \in N(x) | \Delta(y)=0$ and $c^*(y, d) \leq p\}$ and $Y_2 = \{y \in N(x) | \Delta(y)=0$ and $c^*(y, d) \geq p+1\}$. It can be shown that $Y_1 \neq \emptyset$. To see this, let Q be any route from x to d with cost p+1, and let z be the next node on this route. Then $c(x, z)+c^*(z, d) = p+1$. Since $c(x, z)$ is a positive integer, then $z \in N_r$ for some r such that $0 \leq r \leq p$. If z=d, then $\Delta(z)=0$, since by assumption P never reaches d. If $z \neq d$, then $\Delta(z)=0$, since by the induction hypothesis, P never reaches a node in $N_r$ for $1 \leq r \leq p$. Thus $z \in Y_1$, which establishes that $Y_1 \neq \emptyset$.

Let $\bar{y}$ be the node in N (x) selected in line 4 of the pseudocode of Table 1 for Route (s, d). If $\bar{y} \in Y_2$, then $c(x, y)+c^*(y, d) > c^*(y, d) \geq p+1$. Therefore, it must be that $\bar{y} \in Y_1$, so $\bar{y} \in N_r$ for some r satisfying $0 \leq r \leq p$. By assumption, $\bar{y} \neq d$. In line 5 of the pseudocode of Table 1 for Route (s, d), x forwards the packet to $\bar{y}$. But this contradicts the induction hypothesis that P never reaches a node in $N_r$ for $1 \leq r \leq p$. Accordingly, the lemma is established.

Theorem. The route generated by procedure Route(s, d) terminates at d.

Proof. The procedure Route (s, d) terminates if it reaches d, so it suffices to prove that P reaches d. Suppose to the contrary that P never reaches d. Let y be the neighbor of s, selected by Route(s, t), to which the source s forwards the packet. Defining $c=c^*$ (y, d), then $y \in N_c$. However, by the Lemma, P never reaches a node in $N_c$, which is a contradiction. Hence P must reach d, thereby establishing the convergence theorem for Route (s, d) of Table 1.

Figure 8:
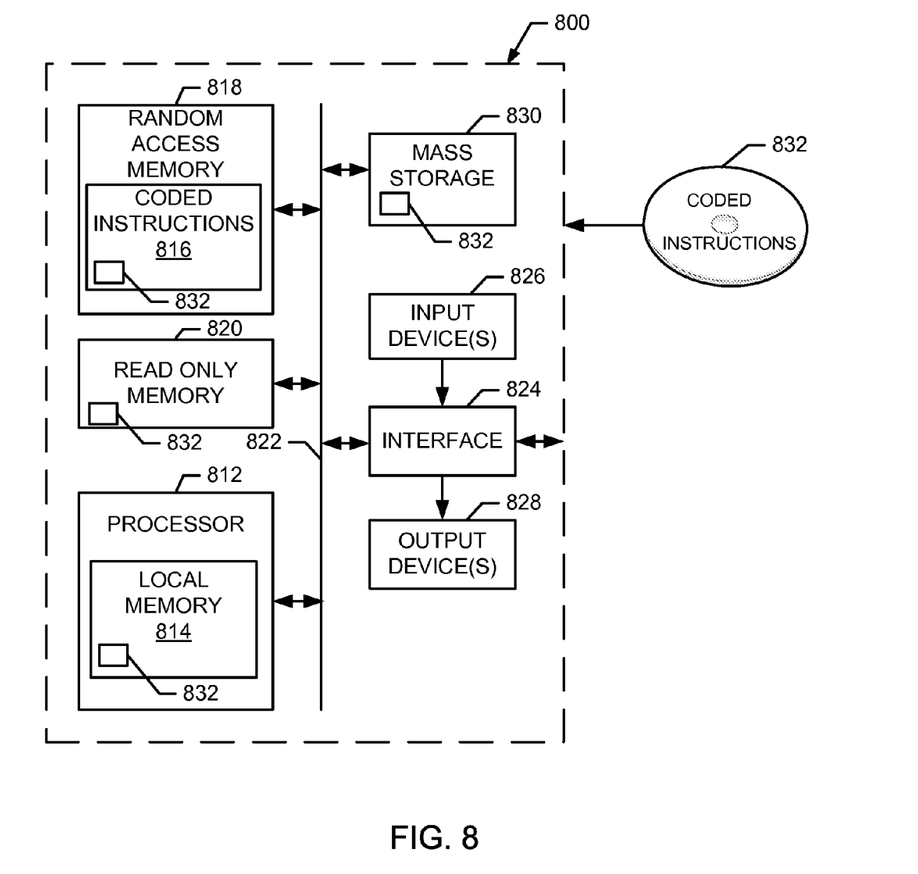
FIG. 8 is a block diagram of an example processing system that may execute the example machine readable instructions of FIG. 6 to implement the example alternate routing processor of FIG. 4.

FIG. 8 is a block diagram of an example processing system 800 capable of implementing the apparatus and methods disclosed herein. The processing system 800 can be, for example, a server, a personal computer, a personal digital assistant (PDA), an Internet appliance, or any other type of computing device.

The system 800 of the instant example includes a processor 812 such as a general purpose programmable processor. The processor 812 includes a local memory 814, and executes coded instructions 816 present in the local memory 814 and/or in another memory device. The processor 812 may execute, among other things, the machine readable instructions represented in FIG. 6 and Table 1. The processor 812 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The processing system 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 800 also includes one or more mass storage devices 830 for storing machine readable instructions and data. Examples of such mass storage devices 830 include floppy disk drives, hard drive disks, compact disk drives and digital versatile disk (DVD) drives.

The coded instructions 832 of FIG. 6 and Table 1 may be stored in the mass storage device 830, in the volatile memory 818, in the non-volatile memory 820, in the local memory 814 and/or on a removable storage medium, such as a CD or DVD 832.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to route a data packet, the method comprising:
   processing a label stack of the data packet at a first node to determine whether the data packet is undergoing alternative routing to a destination;
   in response to determining that the data packet is undergoing the alternative routing, processing the label stack at the first node to determine multiplicity values for neighbor nodes of the first node, respective ones of the multiplicity values representing respective numbers of times the data packet has been routed to respective ones of the neighbor nodes while undergoing the alternative routing to the destination; and
   updating the label stack to increase a respective multiplicity value associated with the first node prior to routing the data packet from the first node to a first one of the neighbor nodes selected based on the multiplicity values.

2. The method as defined in claim 1, wherein processing the label stack to determine whether the data packet is undergoing alternative routing comprises determining whether the label stack includes a backup label assigned to a second node to which the data packet has already been routed, the backup label being different from a primary label also assigned to the second node, the backup label identifying the second node and indicating that the data packet is undergoing alternative routing.

3. The method as defined in claim 1, wherein processing the label stack at the first node to determine the multiplicity values comprises:
   accessing, from the label stack, respective labels identifying the neighbor nodes; and
   reading the respective ones of the multiplicity values associated with the respective ones of the neighbor nodes from fields of the labels.

4. The method as defined in claim 3, wherein updating the label stack to increase the respective multiplicity value associated with the first node comprises incrementing a field of a first label included in the label stack, the first label identifying the first node, the field of the first label representing the respective multiplicity value associated with the first node.

5. The method as defined in claim 1, wherein the label stack includes labels identifying a plurality of nodes to which the data packet has already been routed, and processing the label stack at the first node to determine the multiplicity values comprises:
   counting respective ones of the labels identifying the respective ones of the neighbor nodes to determine respective numbers of labels included in the label stack for the respective ones of the neighbor nodes; and setting the respective ones of the multiplicity values associated with the respective ones of the neighbor nodes from fields to be equal to the respective numbers of labels included in the label stack for the respective ones of the neighbor nodes.

6. The method as defined in claim 5, wherein updating the label stack to increase the respective multiplicity value associated with the first node comprises adding a first label to the label stack, the first label identifying the first node.

7. The method as defined in claim 1, further comprising:
in response to determining that the data packet is not undergoing alternative routing, determining, at the first node, whether a primary route from the first node towards the destination is available; and
in response to determining that the primary route is unavailable, adding a backup label to the label stack prior to routing the data packet from the first node to the destination along an alternate path, the backup label (1) identifying the first node, (2) indicating that the data packet is undergoing alternative routing, and (3) representing that the respective multiplicity value for the first node is equal to one.

8. A tangible machine readable storage medium comprising machine readable instructions which, when executed, cause a machine to perform operations comprising:
determining whether a data packet is undergoing alternative routing to a destination based on a label stack of the data packet;
in response to determining that the data packet is undergoing the alternative routing, processing the label stack at a first node to determine multiplicity values for neighbor nodes of the first node, respective ones of the multiplicity values representing respective numbers of times the data packet has been routed to respective ones of the neighbor nodes while undergoing the alternative routing to the destination; and
updating the label stack to increase a respective multiplicity value associated with the first node prior to routing the data packet from the first node to a first one of the neighbor nodes selected based on the multiplicity values.

9. The storage medium as defined in claim 8, wherein determining whether the data packet is undergoing alternative routing comprises determining whether the label stack includes a backup label assigned to a second node to which the data packet has already been routed, the backup label being different from a primary label also assigned to the second node, the backup label identifying the second node and indicating that the data packet is undergoing alternative routing.

10. The storage medium as defined in claim 8, wherein processing the label stack at the first node to determine the multiplicity values comprises:
accessing, from the label stack, respective labels identifying the neighbor nodes; and
reading the respective ones of the multiplicity values associated with the respective ones of the neighbor nodes from fields of the labels.

11. The storage medium as defined in claim 10, wherein updating the label stack to increase the respective multiplicity value associated with the first node comprises incrementing a field of a first label included in the label stack, the first label identifying the first node, the field of the first label representing the respective multiplicity value associated with the first node.

12. The storage medium as defined in claim 8, wherein the label stack includes labels identifying a plurality of nodes to which the data packet has already been routed, and processing the label stack at the first node to determine the multiplicity values comprises:
counting respective ones of the labels identifying the respective ones of the neighbor nodes to determine respective numbers of labels included in the label stack for the respective ones of the neighbor nodes; and
setting the respective ones of the multiplicity values associated with the respective ones of the neighbor nodes from fields to be equal to the respective numbers of labels included in the label stack for the respective ones of the neighbor nodes.

13. The storage medium as defined in claim 12, wherein updating the label stack to increase the respective multiplicity value associated with the first node comprises adding a first label to the label stack, the first label identifying the first node.

14. The storage medium as defined in claim 8, wherein the operations further comprise:
in response to determining that the data packet is not undergoing alternative routing, determining, at the first node, whether a primary route from the first node towards the destination is available; and
in response to determining that the primary route is unavailable, adding a backup label to the label stack prior to routing the data packet from the first node to the destination along an alternate path, the backup label (1) identifying the first node, (2) indicating that the data packet is undergoing alternative routing, and (3) representing that the respective multiplicity value for the first node is equal to one.

15. An apparatus to route a data packet, the apparatus comprising:
a memory having machine readable instructions stored thereon; and
a processor to execute the instructions to perform operations comprising:
determining whether a data packet is undergoing alternative routing to a destination based on a label stack of the data packet;
in response to determining that the data packet is undergoing the alternative routing, processing the label stack at a first node to determine multiplicity values for neighbor nodes of the first node, respective ones of the multiplicity values representing respective numbers of times the data packet has been routed to respective ones of the neighbor nodes while undergoing the alternative routing to the destination; and
updating the label stack to increase a respective multiplicity value associated with the first node prior to routing the data packet from the first node to a first one of the neighbor nodes selected based on the multiplicity values.

16. The apparatus as defined in claim 15, wherein processing the label stack at the first node to determine the multiplicity values comprises:
accessing, from the label stack, respective labels identifying the neighbor nodes; and
reading the respective ones of the multiplicity values associated with the respective ones of the neighbor nodes from fields of the labels.

17. The apparatus as defined in claim 16, wherein updating the label stack to increase the respective multiplicity value associated with the first node comprises incrementing a field of a first label included in the label stack, the first label identifying the first node, the field of the first label representing the respective multiplicity value associated with the first node.

18. The apparatus as defined in claim 15, wherein the label stack includes labels identifying a plurality of nodes to which the data packet has already been routed, and processing the label stack at the first node to determine the multiplicity values comprises:
- counting respective ones of the labels identifying the respective ones of the neighbor nodes to determine respective numbers of labels included in the label stack for the respective ones of the neighbor nodes; and
- setting the respective ones of the multiplicity values associated with the respective ones of the neighbor nodes from fields to be equal to the respective numbers of labels included in the label stack for the respective ones of the neighbor nodes.

19. The apparatus as defined in claim 18, wherein updating the label stack to increase the respective multiplicity value associated with the first node comprises adding a first label to the label stack, the first label identifying the first node.

20. The apparatus as defined in claim 15, wherein the operations further comprise:
- in response to determining that the data packet is not undergoing alternative routing, determining, at the first node, whether a primary route from the first node towards the destination is available; and
- in response to determining that the primary route is unavailable, adding a backup label to the label stack prior to routing the data packet from the first node to the destination along an alternate path, the backup label (1) identifying the first node, (2) indicating that the data packet is undergoing alternative routing, and (3) representing that the respective multiplicity value for the first node is equal to one.

* * * * *